US008694808B2

(12) United States Patent
Zhu (10) Patent No.: US 8,694,808 B2
(45) Date of Patent: Apr. 8, 2014

(54) METHOD AND APPARATUS FOR POWER SUPPLY PROTOCOL MANAGEMENT, AND POWER SUPPLY SYSTEM APPLYING THEM

(71) Applicant: Huawei Technologies Co., Ltd., Guangdong (CN)

(72) Inventor: Xiaoming Zhu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/929,447

(22) Filed: Jun. 27, 2013

(65) Prior Publication Data
US 2013/0290748 A1    Oct. 31, 2013

Related U.S. Application Data

(63) Continuation of application No. PCT/CN2011/079002, filed on Aug. 26, 2011.

(30) Foreign Application Priority Data

Dec. 28, 2010    (CN) .......................... 2010 1 0609170

(51) Int. Cl.
*G06F 1/00*    (2006.01)
*G06F 1/32*    (2006.01)
(52) U.S. Cl.
USPC ........................... 713/300; 713/310; 713/320
(58) Field of Classification Search
USPC ........................................................ 713/300
See application file for complete search history.

(56) References Cited

U.S. PATENT DOCUMENTS

| 4,490,780 A | 12/1984 | Nondahl |
| 6,035,407 A * | 3/2000 | Gebara et al. ................. 713/300 |
| 6,694,272 B1 * | 2/2004 | Zvonar ............................ 702/64 |
| 6,772,356 B1 * | 8/2004 | Qureshi et al. ................ 713/321 |
| 6,823,465 B2 * | 11/2004 | Zhang ............................ 713/300 |
| 6,885,233 B2 * | 4/2005 | Huard et al. .................. 327/513 |
| 6,952,748 B1 * | 10/2005 | Guerrero et al. ............. 710/113 |
| 7,039,817 B2 * | 5/2006 | Burnham et al. ............. 713/320 |
| 7,366,929 B1 | 4/2008 | Mimberg |

(Continued)

FOREIGN PATENT DOCUMENTS

| CN | 1524209 A | 8/2004 |
| CN | 1742421 A | 3/2006 |

(Continued)

OTHER PUBLICATIONS

International Search Report dated Dec. 8, 2011 in connection with International Patent Application No. PCT/CN2011/079002.

*Primary Examiner* — Suresh Suryawanshi (57) ABSTRACT

A power supply system includes a PWM power supply connected to and supplying power to a power-consuming unit and a power supply protocol management apparatus connected to the power-consuming unit through a transmission bus for acquiring a VID protocol of the power-consuming unit and acquiring a VID code conversion table matching the VID protocol. The power supply protocol management apparatus converts a VID code output by the power-consuming unit (on the basis of the VID protocol) into a required voltage of the power-consuming unit according to the VID code conversion table, compares the required voltage with a voltage at an output end of the PWM power supply to generate a feedback voltage value, and transmits the generated feedback voltage value to the PWM power supply which adjusts its output voltage according to the feedback voltage value.

10 Claims, 7 Drawing Sheets

(56) References Cited

U.S. PATENT DOCUMENTS

| | | | |
|---|---|---|---|
| 7,779,279 B2* | 8/2010 | Huang et al. | 713/310 |
| 7,948,422 B2* | 5/2011 | Chiu | 341/155 |
| 8,312,303 B2* | 11/2012 | Huang et al. | 713/310 |
| 2002/0109489 A1 | 8/2002 | Shaver et al. | |
| 2002/0188874 A1 | 12/2002 | Yu et al. | |
| 2002/0194516 A1 | 12/2002 | Muratov et al. | |
| 2004/0145845 A1 | 7/2004 | Schuellein | |
| 2005/0039059 A1 | 2/2005 | Park | |
| 2006/0043947 A1 | 3/2006 | Clavette et al. | |
| 2006/0085656 A1* | 4/2006 | Betts-LaCroix | 713/300 |
| 2008/0012742 A1 | 1/2008 | Wu et al. | |
| 2009/0037752 A1 | 2/2009 | Takiguchi et al. | |
| 2009/0172656 A1 | 7/2009 | Landry et al. | |
| 2009/0174389 A1 | 7/2009 | Osburn | |

FOREIGN PATENT DOCUMENTS

| | | |
|---|---|---|
| CN | 101218553 A | 7/2008 |
| CN | 101441491 A | 5/2009 |
| CN | 101483387 A | 7/2009 |
| CN | 102130899 A | 7/2011 |
| TW | 594465 B | 6/2004 |
| WO | WO 2008/008353 A2 | 1/2008 |
| WO | WO 2009/150573 A2 | 12/2009 |

* cited by examiner

METHOD AND APPARATUS FOR POWER SUPPLY PROTOCOL MANAGEMENT, AND POWER SUPPLY SYSTEM APPLYING THEM

CROSS-REFERENCE TO RELATED APPLICATIONS

This application is a continuation of International Application No. PCT/CN2011/079002, filed on Aug. 26, 2011, which claims priority to Chinese Patent Application No. 201010609170.1, filed on Dec. 28, 2010, both of which are hereby incorporated by reference in their entireties.

TECHNICAL FIELD

The present invention relates to a power supply, and in particular, to an apparatus and a method for power supply adaptation, and a power supply applying them.

BACKGROUND

A power supply is a premise for various electronic devices to work normally, and therefore, a power supply apparatus appears to be particularly important in the electronic devices. Because power supply protocols between different electronic devices or even between products of a same device in different models are different, structures of power supply apparatuses between different electronic devices are caused to be different and be mutually incompatible. This problem is particularly obvious in a host power supply of a computer. A CPU (central processing unit) of the computer is updated and upgraded continually, each type of CPU has a different power supply protocol management apparatus, and different power supply circuits needs to be designed for different power supply protocol management apparatuses, and therefore, there are various power supplies in the market, and these power supplies are not universal, thereby causing a waste of a resource.

SUMMARY

Embodiments of the present invention provide a universal method and apparatus for power supply protocol management, and a power supply system applying them.

A power supply protocol management method includes the following steps:

acquiring a VID protocol of a power-consuming unit;

searching for a pre-stored VID protocol which corresponds to the acquired VID protocol of the power-consuming unit, and a VID code conversion table which corresponds to the found pre-stored VID protocol;

acquiring a VID code output by the power-consuming unit, searching the VID code conversion table which corresponds to the found pre-stored VID protocol for a DAC control code which corresponds to the VID code, and outputting the DAC control code; and acquiring a required voltage of the power-consuming unit according to the DAC control code, and comparing the required voltage with a power supply input voltage of the power-consuming unit to acquire a feedback voltage.

A power supply protocol management apparatus includes:

a storage module, configured to store a VID code conversion table;

a power supply control code conversion module, configured to acquire a voltage identification VID protocol of a power-consuming unit and a VID code that is sent by the power-consuming unit according to the VID protocol, search the storage module for the VID code conversion table matching the VID protocol according to the VID protocol, search the found VID code conversion table for a DAC control code which corresponds to the VID code output by the power-consuming unit and output the DAC control code; and a DAC module, which is used by the power supply control code conversion module, configured to receive the DAC control code output by the power supply control code conversion module, and output a corresponding required voltage according to the DAC control code.

A power supply system includes a PWM power supply and a power-consuming unit, where the PWM power supply is connected to the power-consuming unit to supply power to the power-consuming unit. The power supply system further includes a power supply protocol management apparatus, where the power supply protocol management apparatus is configured to acquire a VID protocol of the power-consuming unit and acquire a VID code conversion table matching the VID protocol. The power supply protocol management apparatus converts a VID code output by the power-consuming unit on the basis of the VID protocol into a required voltage of the power-consuming unit according to the VID code conversion table, and compares the required voltage with a power supply input voltage of the power-consuming unit to generate a feedback voltage value, and the PWM power supply receives the feedback voltage and adjusts its output voltage according to the feedback voltage value so that its output voltage equals the required voltage of the power-consuming unit.

In the method and the apparatus for power supply protocol management, and the power supply system applying them which are provided in the embodiments of the present invention, by searching the pre-stored VID protocol for a VID protocol which corresponds to or matches the VID protocol of the power-consuming unit and processing a VID signal output by the power-consuming unit on the basis of the found VID protocol, the universality of the method and the apparatus for power supply protocol management and the power supply system applying them can be effectively improved so that an application scope is expanded.

DETAILED DESCRIPTION

Figure 1:
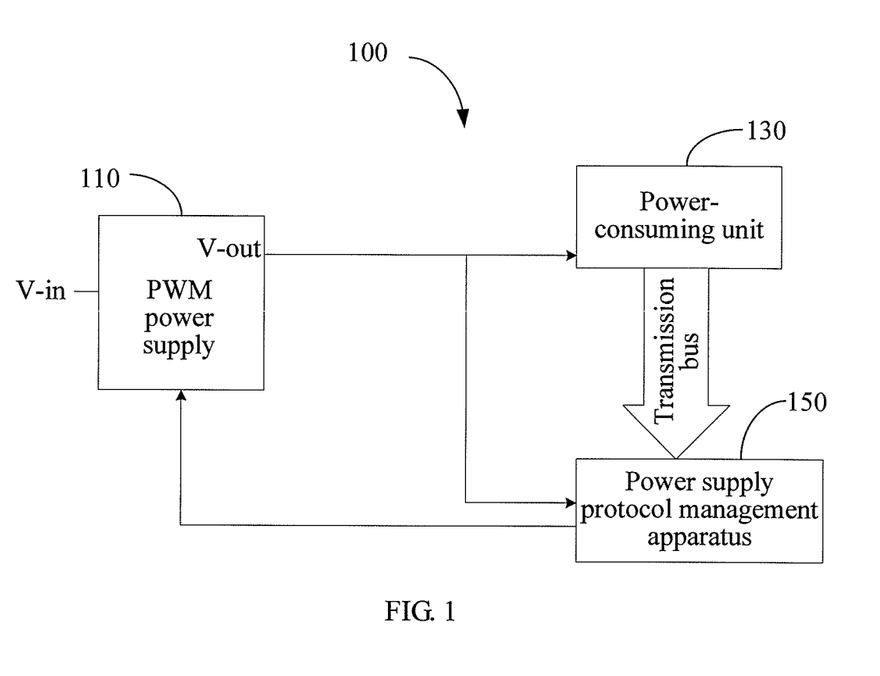
FIG. 1 is a power supply system according to a first embodiment of the present invention.

Referring to FIG. 1, a first embodiment of the present invention provides a power supply system 100, and the power supply system 100 includes a pulse-width modulation (PWM) power supply 110, a power-consuming unit 130 having a voltage identification (VID) protocol, and a power supply protocol management apparatus 150. The PWM power supply 110 is connected to the power-consuming unit 130 to supply power to the power-consuming unit 130. The power supply protocol management apparatus 150 is connected to the power-consuming unit 130 via a transmission bus to acquire the VID protocol of the power-consuming unit 130, and acquire a VID code conversion table matching the VID protocol. The power supply protocol management apparatus 150 converts a VID code output by the power-consuming unit 130 on the basis of the VID protocol into a required voltage of the power-consuming unit 130 according to the VID code conversion table, and compares the required voltage with a power supply input voltage of the power-consuming unit 130 to generate a feedback voltage. The PWM power supply 110 receives the feedback voltage and adjusts its output voltage so that its output voltage equals the required voltage of the power-consuming unit 130 according to the feedback voltage.

Figure 2:
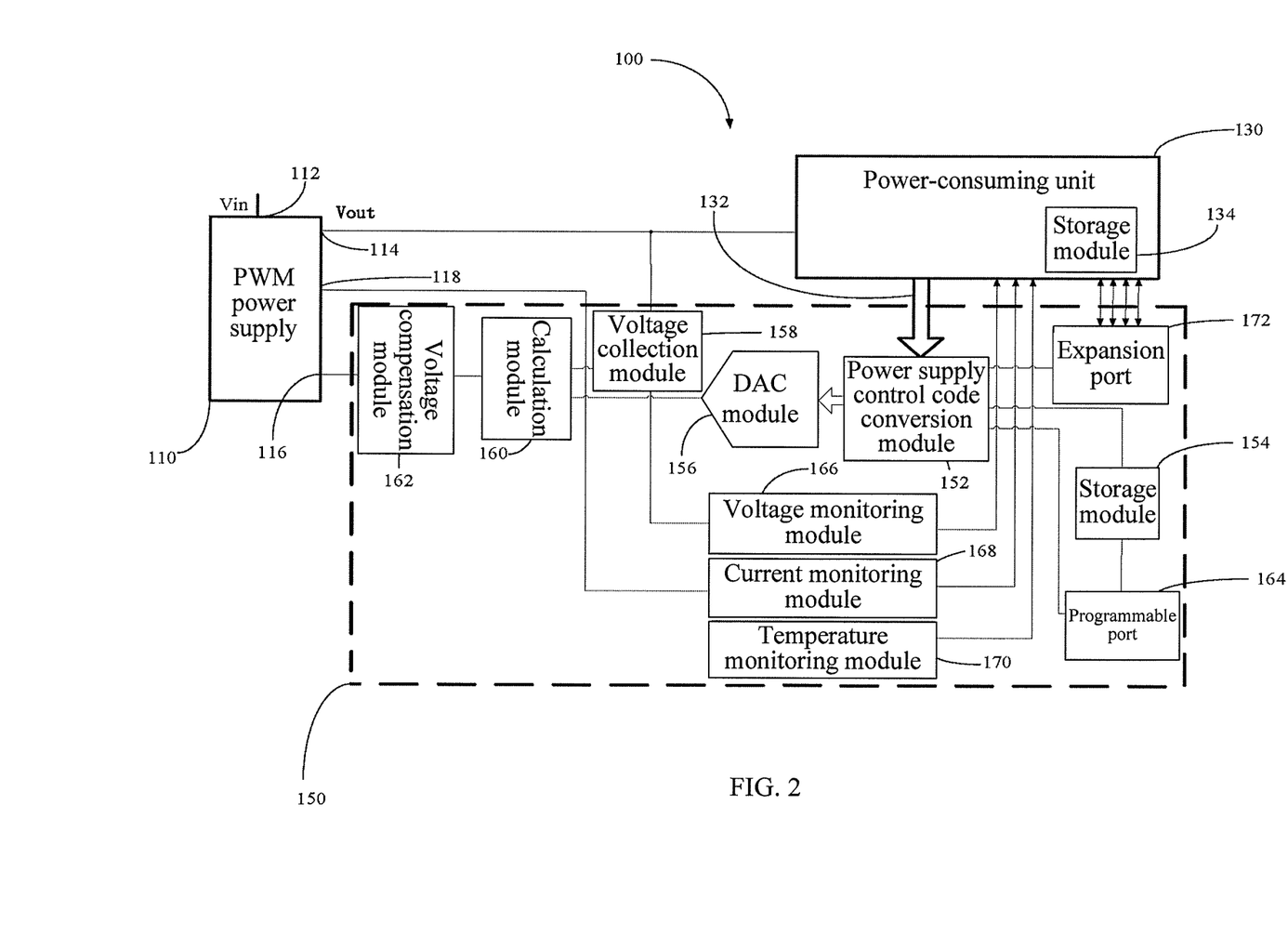
FIG. 2 is a hardware architecture diagram of the power supply system in FIG. 1.

Referring to FIG. 2, it is a hardware architecture diagram of the power supply system 100 in the embodiment of the present invention. The PWM power supply 110 has a power supply input end 112, a power supply output end 114, and a feedback voltage input end 116. The PWM power supply 110 in this embodiment further includes a current sampling end 118 which is configured to output a sampling current. The power supply input end 112 is configured to be connected to a direct current regulated power supply; the power supply output end 114 is configured to output a voltage modulated by the PWM power supply 110; the feedback voltage input end 116 is connected to the power supply protocol management apparatus 150 to receive the feedback voltage output by the power supply protocol management apparatus 150. The PWM power supply 110 adjusts an output voltage of its power supply output end 114 according to the feedback voltage, so that its output voltage equals the required voltage of the power-consuming unit 130. The current sampling end 118 is connected to the power supply protocol management apparatus 150 to report a current state inside the power supply protocol management apparatus 150 to the power supply protocol management apparatus 150 in real time, and the power supply protocol management apparatus 150 compares the current output by the current sampling end 118 with a predetermined current threshold, so as to judge whether the PWM power supply 110 is currently in an overcurrent state or a lightload state, and accordingly, send an overcurrent indication or a lightload indication to the power-consuming unit 130, and the power-consuming unit 130 dynamically adjusts its output VID code according to the overcurrent indication or the lightload indication.

The power-consuming unit 130 includes the transmission bus 132, and a storage module 134. The transmission bus 132 is configured to exchange information with the power supply protocol management apparatus 150 so as to achieve control over the PWM power supply 110. The VID protocol of the power-consuming unit 130 is stored in the storage module 134. The power-consuming unit 130 may adjust the required voltage dynamically according to its operation needs, and transmit the voltage requirements in a form of the VID code to the power supply protocol management apparatus 150 via the transmission bus 132. The VID code is as described in Table 1, and different VID codes represent different voltage requirements. The following table is merely used for illustrating the meaning of the VID code, and the present invention is not limited to the VID code forms given in the following table.

TABLE 1

| VID6 | VID5 | VID4 | VID3 | VID2 | VID1 | VID0 | Vout (V) |
|---|---|---|---|---|---|---|---|
| 0 | 0 | 0 | 0 | 0 | 0 | 0 | 1.5000 |
| 0 | 0 | 0 | 0 | 0 | 0 | 1 | 1.4875 |
| 0 | 0 | 0 | 0 | 0 | 1 | 0 | 1.4750 |
| 0 | 0 | 0 | 0 | 0 | 1 | 1 | 1.4625 |

The power supply protocol management apparatus 150 includes a power supply control code conversion module 152, a storage module 154, a DAC module 156, a voltage collection module 158, a calculation module 160, and a voltage compensation module 162.

Figure 3:
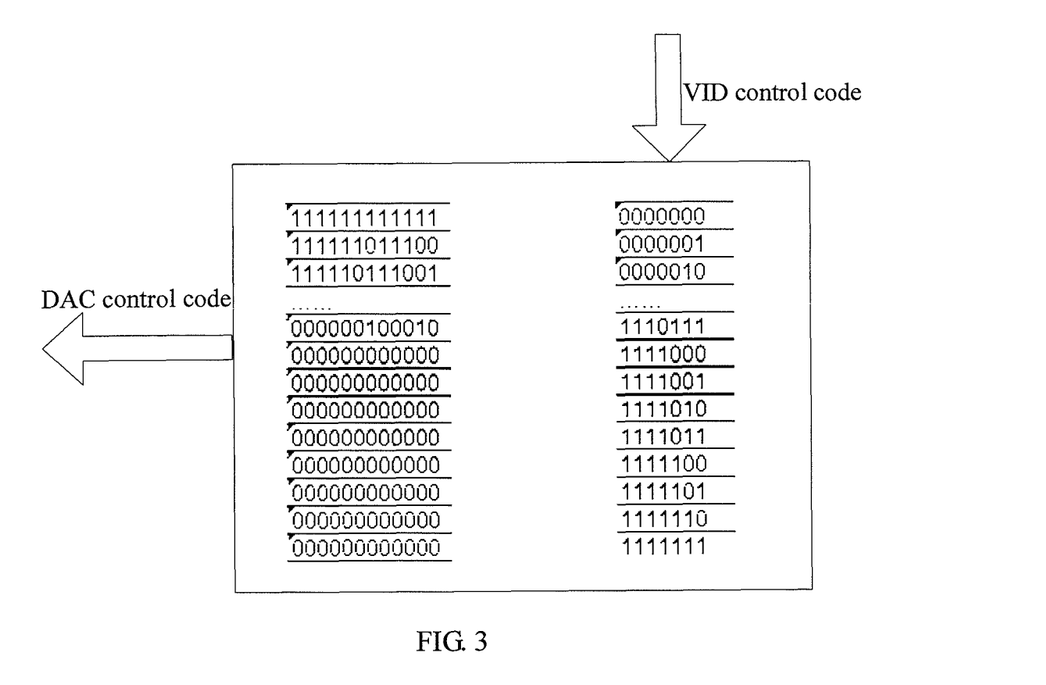
FIG. 3 is a schematic diagram of a VID code conversion table in the power supply system in FIG. 2.

The power supply control code conversion module 152 is configured to acquire the VID protocol of the power-consuming unit 130 and receive the VID code that is sent by the power-consuming unit 130 on the basis of the VID protocol. After acquiring the VID protocol of the power-consuming unit 130 and the VID code, the power supply control code conversion module 152 searches for a VID code conversion table matching the VID protocol of the power-consuming unit 130 according to the VID protocol, finds a digital-to-analog converter (DAC) control code which corresponds to the VID code output by the power-consuming unit from the found VID code conversion table, and then outputs the found DAC control code. The VID code conversion table includes the VID code and the DAC control code which corresponds to the VID code, where a voltage value which corresponds to the VID code changes according to different VID protocols. Reference may be made to FIG. 3 for the VID code conversion table, where the VID code and the DAC control code which corresponds to the VID code are included in the VID code conversion table. In this embodiment, the VID code and the DAC control code are stored in the storage module 154, and the VID code is taken as a storage address of the DAC control code directly, that is, accessed data content with an acquired VID code as an address may be considered as a DAC control code which corresponds to the VID code. After receiving the VID code output by the power-consuming unit 130, the power supply control code conversion module 152 extracts the DAC control code which is stored in the storage module 154 and uses the VID code as the address, and transmits the DAC control code to the DAC module 156. It may be understood that other correspondence or another mapping relationship may further be adopted between the VID code and the DAC control code to establish the VID code conversion table. In this embodiment, the power supply control code conversion module 152 may be implemented by adopting a complex programmable logic device (CPLD) or a field-programmable gate array (FPGA) or a single-chip microcomputer, but is not limited to the foregoing devices. When the power supply control code conversion module 152 is implemented by adopting the CPLD or FPGA, various logic blocks which are configured to implement functions of the power supply control code conversion module 152 are integrated in the CPLD and the FPGA, such as a logic resource, a trigger resource, and a cable layout resource. These logic blocks are connected with each other in an editable manner according to different requirements or through functions preset by software, so as to form a logic circuit having predetermined functions. In this way, the power supply control code conversion module 152 has a function of generating a predetermined circuit according to requirements. In other words, the power supply control code conversion module 152 can construct a required circuit according to a predetermined cable layout manner, this predetermined cable layout manner may be achieved by design apparatuses such as a computer, the predetermined cable layout manner is input into the CPLD or the FPGA via a bus, and the CPLD or the FPGA generates the predetermined circuit according to the predetermined cable layout manner.

The storage module 154 is configured to store one or more different VID protocols and the VID code conversion table which matches the VID protocols.

Figure 4:
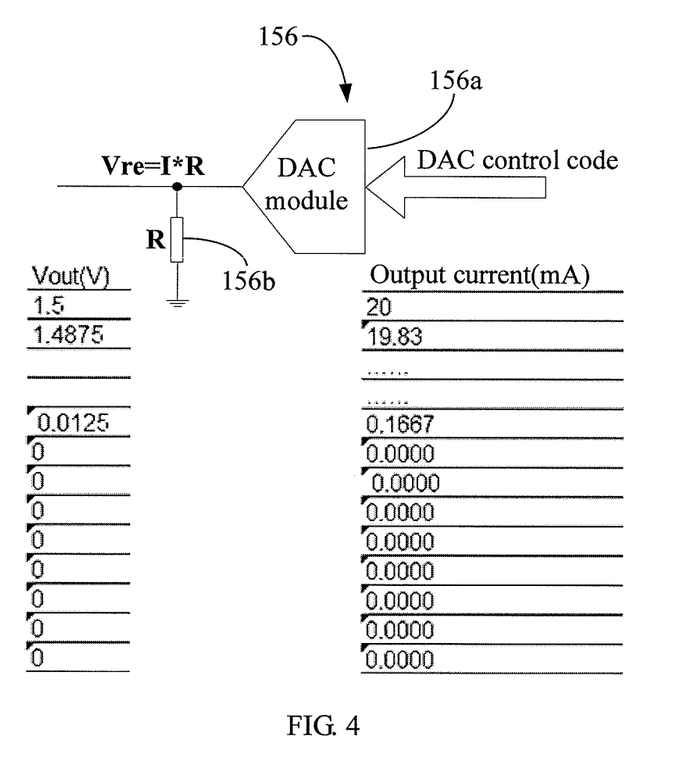
FIG. 4 is a structural diagram of a DAC module in the power supply system in FIG. 2.

The DAC module 156 is configured to receive the DAC control code output by the power supply control code conversion module 152, and output a corresponding required voltage Vdac according to the DAC control code. The DAC module 156 in this embodiment includes one digital-to-analog (DA) converter 156a. The DA converter 156a may be classified into a current type or a voltage type; and the DA converter 156a may output the voltage directly if the DA converter 156a is the voltage type, and if the DA converter 156a is the current type, that is, a physical quantity output by the DA converter 156a is the current, in this case, referring to FIG. 4, a proper resistor 156b is needed to transform an output current of the DA converter 156a into a required voltage, and in this embodiment, the resistor 156b is connected at the end of the DA converter 156a. An input end of the DA converter 156a is connected to an output end of the power supply control code conversion module 152 to receive the DAC control code. The DA converter 156a outputs a corresponding current value I according to the DAC control code. One end of the resistor 156b is connected to an output end of the DA converter 156a, the other end is grounded, and the resistor 156b is configured to transform the output current I of the DA converter 156a into the corresponding required voltage Vdac according to the Ohm's law V=R*I.

The voltage collection module 158 is connected to the power supply output end 114 of the PWM power supply 110 to acquire an output voltage Vout of the PWM power supply 110, that is, the power supply input voltage of the power-consuming unit 130. It can be understood that the voltage collection module 158 is only a virtual unit for clearly describing the embodiment of the present invention, which may only be a transmission circuit consisting of conducting wires in practical applications.

Figure 5:
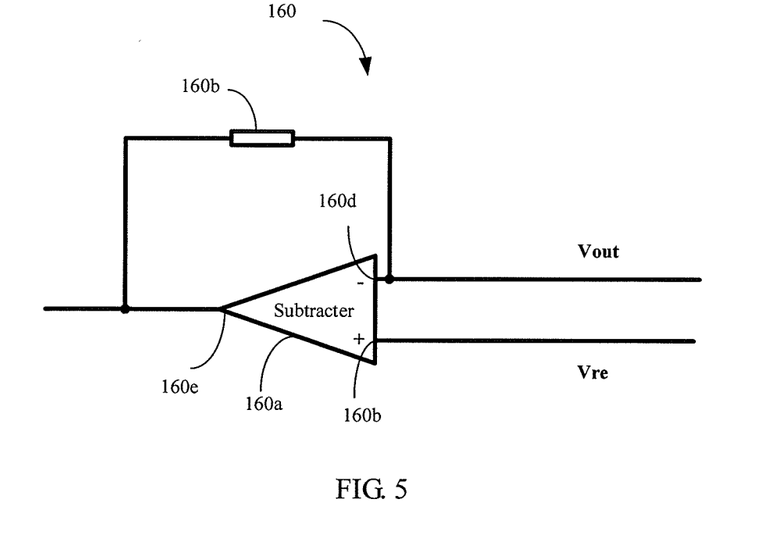
FIG. 5 is a structural diagram of a calculation module in the power supply system in FIG. 2.

The calculation module 160 is configured to receive the output voltage Vout collected by the voltage collection module 158, or in another word, to receive the power supply input voltage of the power-consuming unit 130, and the required voltage Vdac output by the DAC module 156, calculate a voltage difference ΔV between the output voltage Vout/the power supply input voltage and the required voltage Vdac, and output and amplify the voltage difference ΔV. Referring to FIG. 5, in this embodiment, the calculation module 160 includes a subtracter 160a and a bias resistor 160b. The subtracter 160a is configured to subtract the required voltage Vdac from the output voltage Vout or the power supply input voltage of the power-consuming unit so as to acquire a difference between the two, the subtracter 160a includes a positive input end 160c, an inverting input end 160d, and an output end 160e, and the positive input end 160c is configured to receive the output voltage Vout, and the inverting input end 160d is configured to receive the required voltage Vdac. The bias resistor 160b is connected between the inverting input end 160d of the subtracter 160a and the output end 160e of the subtracter 160a to enable the subtracter 160a in a working state of amplification.

The voltage compensation module 162 is connected to an output end of the calculation module 160 to provide one compensation voltage Vc, and the voltage value of the compensation voltage equals the voltage value Vref of a reference voltage inside the PWM power supply 110. In this embodiment, the voltage compensation module 162 may be implemented via an adder so as to add the voltage difference ΔV output by the calculation module 160 to the compensation voltage Vc output by the voltage compensation module 162 to form a feedback voltage Vsense required by the PWM power supply 110, and the feedback voltage Vsense is input into the feedback voltage input end 116 end of the PWM power supply 110 for the PWM power supply 110 to adjust its output voltage according to the feedback voltage Vsense, so as to enable its output voltage to equal the required voltage Vdac of the power-consuming unit, thereby enabling its output voltage Vout to meet dynamic requirements of the power-consuming unit 130.

The power supply protocol management apparatus 150 may further include one programmable control port 164, where the programmable control port 164 is connected to the storage module 154 and is connected to the power supply control code conversion module 152 to write a new VID protocol or/and a VID code conversion table which corresponds to the VID protocol into the power supply control code conversion module 152 and/or the storage module 154, thereby upgrading the power supply protocol management apparatus 150 so as to adapt to rapid update and upgrade of the VID protocol of the power-consuming unit 130. A method of writing the VID protocol and the VID code conversion table into the power supply protocol management apparatus 150 through the programmable control port 164 may be implemented in a manual way, and may also be by loading the VID protocol and the VID code conversion table into the power supply protocol management apparatus 150 via a general bus using the computer.

Besides, the power supply protocol management apparatus 150 further includes one voltage monitoring module 166, one current monitoring module 168, and one temperature monitoring module 170. One end of the voltage monitoring module 166 is connected to the voltage input end of the power-consuming unit 130, and the other end is connected to the power-consuming unit 130; and the voltage monitoring module 166 is configured to monitor the voltage state of the input end of the power-consuming unit 130, and send an indication of overvoltage or undervoltage to the power-consuming unit 130. One end of the current monitoring module 168 is connected on the current sampling output end 118 of the PWM power supply 110, and the other end is connected to the power-consuming unit 130, and the current monitoring module 168 is configured to monitor the current state of the PWM power supply 110, and send an indication of lightload or overcurrent to the power-consuming unit 130. The temperature monitoring module 170 is connected to the power-consuming unit 130 to monitor the working temperature, and send a temperature alarm indication to the power-consuming unit 130 under the condition that a temperature exception occurs.

In order to make the power supply protocol management apparatus 150 have a wider using scope, an extended interface 172 may be reserved in the power supply protocol management apparatus 150, and the extended interface 172 includes multiple extended pins and reserved programmable logic circuits; the extended pins are configured to increase the number of interfaces between the power supply protocol management apparatus 150 and a transmission bus of the power-consuming unit 130, so as to adapt to the power-consuming unit 130 having higher power supply control accuracy requirements; and the reserved programmable logic circuits are configured to construct new logic circuits according to new logic function requirements, for example, for the condition that a new support circuit or a peripheral circuit is included in the new VID protocol, a logic circuit having corresponding functions may be constructed via the reserved programmable logic circuits to enable the power supply protocol management apparatus to adapt to developments of technologies for the forward compatibility of the new VID protocol.

In the power supply system 100 provided in the first embodiment of the present invention, the PWM power supply 110 may adjust the voltage according to Vsense to meet the power supply requirements of the power-consuming unit 130 by storing multiple VID protocols in the power supply protocol management apparatus 150, finding the VID protocol which corresponds to the current VID protocol in the power-consuming unit 130 from the multiple stored VID protocols when connecting to the power-consuming unit 130, converting the VID code output by the power-consuming unit into the required voltage of the power-consuming unit 130 on the basis of the protocol, comparing the required voltage with the power supply input voltage of the power-consuming unit 130, that is, the output voltage of the output end of the PWM power supply 110, so as to generate the voltage difference ΔV, and compensating for the voltage difference ΔV to form the feedback voltage Vsense which may be adopted by the PWM power supply 110. In this embodiment, it is no need to change the current architecture of the PWM power supply 110, and it is no need to modify the power supply system according to the VID protocol of the power-consuming unit 13, and only needs to set the power supply protocol management apparatus 150 between the current PWM power supply 110 and the power-consuming unit 130 to utilize the current PWM power supply 110 to supply power to the power-consuming unit 130 having different VID protocols, so as to improve the universality of the power supply system 100. In addition, the power supply protocol management apparatus 150 of the present invention has a programmable control port 164, and may write any random VID protocol into the power supply protocol management apparatus 150 according to the requirements so as to improve an application scope of the power supply protocol management apparatus 150.

Figure 6:
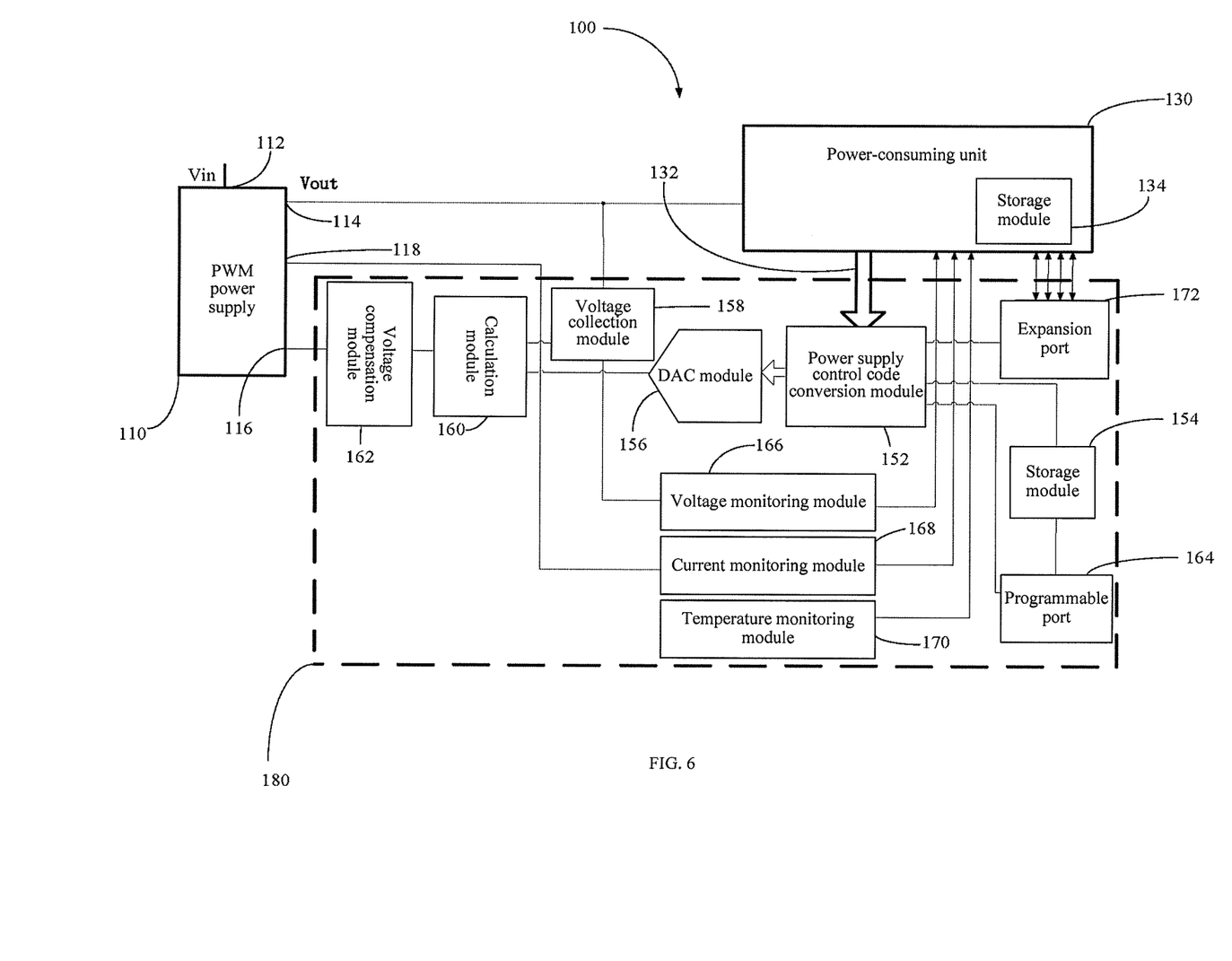
FIG. 6 is another power supply system according to the first embodiment of the present invention.

Referring to FIG. 6, the present invention provides another power supply protocol management apparatus 180, and a difference between the power supply protocol management apparatus 180 and the power supply protocol management apparatus 150 lies in that the power supply protocol management apparatus 180 adopts digital processing and may integrate each function unit that it has into one chip. The power supply protocol management apparatus 180 includes one AD conversion module 182, one digital voltage compensation module 184, and one digital calculation module 186. The AD conversion module 182 is configured to convert the analog signal of the voltage value collected by the voltage collection module 158 into a first digital signal D1, and transmit the first digital signal D1 to the digital calculation module 186. The digital voltage compensation module 184 is configured to convert a compensation voltage into the digital signal which may be identified by the DAC module 156, acquire a second digital signal D2 after adding the digital signal to the DAC control code output by the power supply control code conversion module 152, and transmit the second digital signal D2 to the digital calculation module 186. The digital calculation module 186 is configured to subtract the first digital signal D1 from the second digital signal D2 to acquire a feedback voltage digital signal Dsense, and transmit the feedback voltage digital signal Dsense to the DAC module 156 so as to acquire the feedback voltage Vsense.

The power supply protocol management apparatus 180 provided in this embodiment adopts a digital processing manner, which may simplify the structure of the power supply protocol management apparatus 180.

Figure 7:
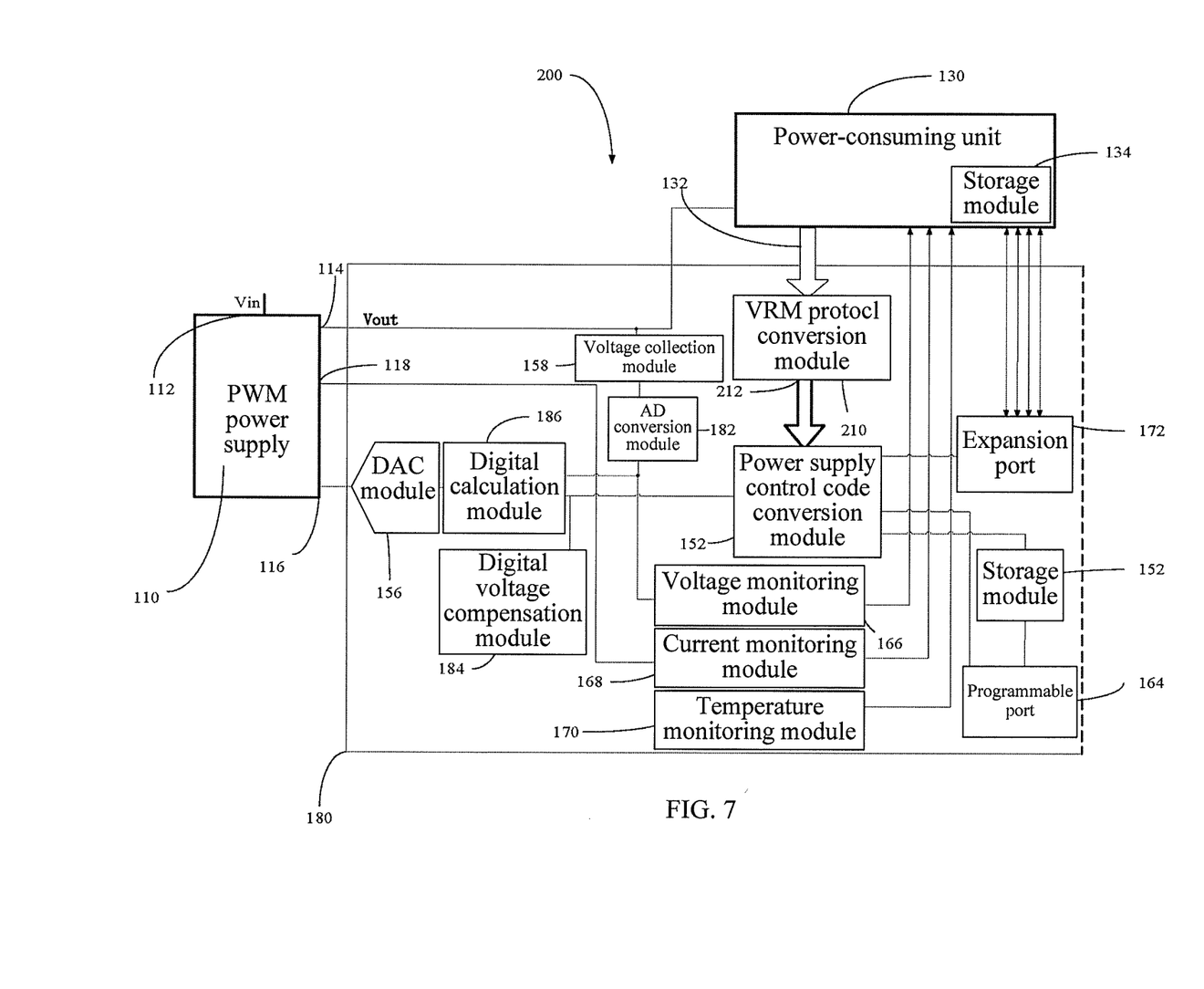
FIG. 7 is another power supply system according to a second embodiment of the present invention.

Referring to FIG. 7, a second embodiment of the present invention provides a power supply system 200, and the difference between the power supply system 200 and the power supply system 100 lies in that the power supply system 200 further includes a VID protocol conversion module 210, the VID protocol conversion module 210 is one part of the power supply protocol management apparatus 150 and 180, and the VID protocol conversion module 210 is connected to the power-consuming unit 130 via a transmission bus 132, and is connected to the power supply control code conversion module 152 via another VID protocol output bus 212. The VID protocol conversion module 210 is configured to acquire the VID protocol in the power-consuming unit 130, convert the acquired VID protocol of the power-consuming unit into anyone existing VID protocol in the power supply protocol management apparatus 150 and 180, transmit the converted VID protocol to the power supply control code conversion module 152, meanwhile, convert the VID code generated by the power-consuming unit 130 on the basis of the VID protocol of the power-consuming unit into the VID code which is based on the converted VID protocol, and transmit the VID code to the power supply control code conversion module 152. The VID protocol conversion method may be performed in a table look-up manner, for example, the version of the power-consuming unit VID protocol that the power-consuming unit 130 has is VRM.11, while various VID protocol versions under VRM.6.5 are stored in the power supply protocol management apparatus 150 and 180, in the usage process, the VID protocol conversion module 210 acquires a VRM.11 protocol version, and establishes correspondence between the VRM.11 and the VRM.6.5 protocol versions, that is, converting the VRM.11 into the VRM.6.5 version; when the power-consuming unit 130 outputs one $VID_{11}$ code on the basis of the VRM.11 protocol, the VID protocol conversion module 210 converts the $VID_{11}$ code into a code $VID_{6.5}$ representing a same voltage requirement on the basis of the VRM.6.5 protocol; it is assumed that in the VRM.11 version, the $VID_{11}$ code representing a voltage value of 1.0 V is 1100010, while the $VID_{6.5}$ code which corresponds to the voltage of 1.0 V in the VRM.6.5 is 1100100, the VID protocol conversion module 210 converts the $VID_{11}$ code into the $VID_{6.5}$ code according to its established correspondence, and transmits the $VID_{6.5}$ code to the power supply protocol management apparatus 150 and 180. The power supply protocol management apparatus 150 and 180 finds a corresponding DAC control code according to the $VID_{6.5}$ code and outputs a corresponding voltage according to the DAC control code. In this embodiment, the VID protocol conversion module 210 may be implemented by adopting the CPLD or the FPGA.

It can be understood that the VID protocol conversion module 210 has a VID protocol conversion function, and therefore, the power supply protocol management apparatus 180 and 150 in this embodiment may merely have a fixed VID protocol, under this condition, the power supply protocol management apparatus 180, 150, and the PWM power supply 110 may be replaced by a conventional existing power supply which corresponds to the fixed VID protocol.

Figure 8:
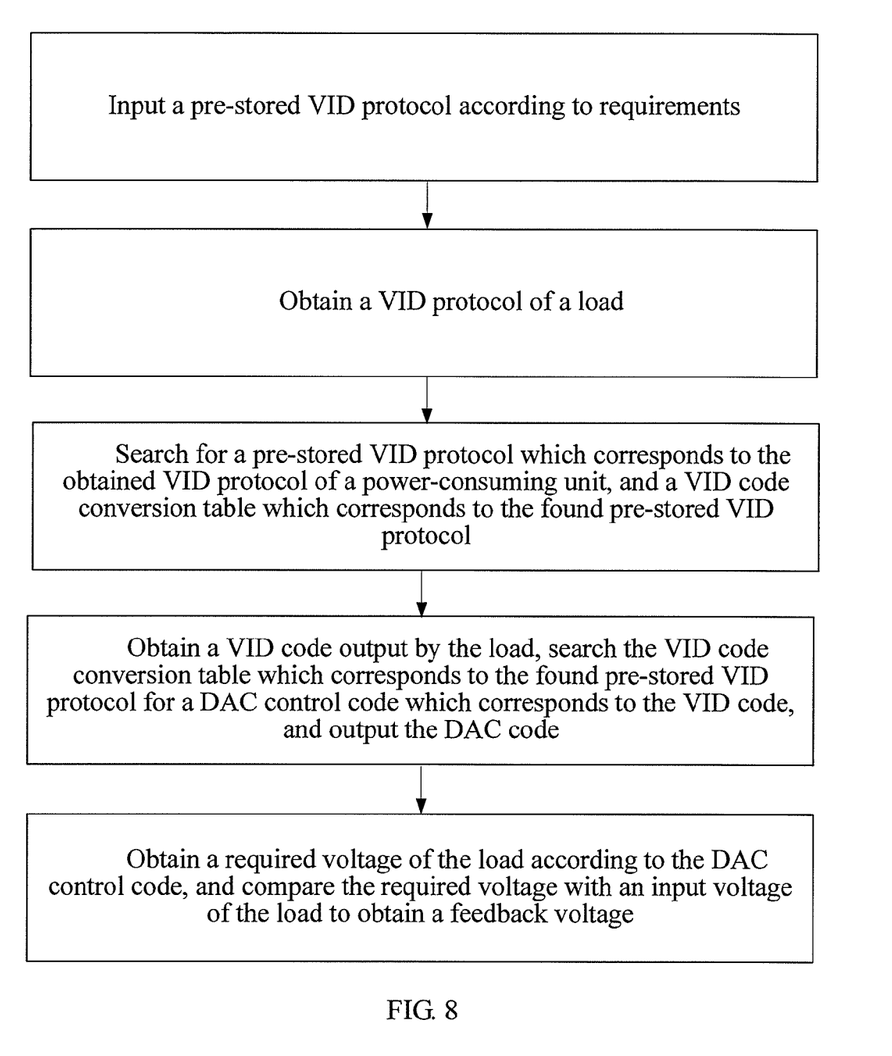
FIG. 8 is a flow chart of a power supply protocol management method according to the present invention.

Referring to FIG. 8, an embodiment of the present invention provides a power supply protocol management method, which includes the following steps:

acquiring a VID protocol of a power-consuming unit;
    where the step is about acquiring the current VID protocol adopted by the power-consuming unit;

searching a pre-stored VID protocol which corresponds to the acquired VID protocol of the power-consuming unit and a VID code conversion table which corresponds to the found pre-stored VID protocol;

where the step is about establishing correct correspondence between the VID protocol of the power-consuming unit and the pre-stored VRM, that is, finding the VID protocol which corresponds to or is the same as the VID protocol of the power-consuming unit in the pre-stored VID protocol, and acquiring the VID code conversion table which corresponds to the found VID protocol;

acquiring a VID code output by the power-consuming unit, searching the VID code conversion table which corresponds to the found pre-stored VID protocol for a DAC control code which corresponds to the VID code, and outputting the DAC control code;

where the step is about finding the DAC control code which corresponds to the VID code via a table look-up manner, so as to acquire the corresponding required voltage; in a process of searching the DAC control code which corresponds to the VID code, the VID code may be taken as a storage address of the DAC control code, and the corresponding DAC control code may be read from an address represented by the VID code so as to simplify the searching process of the DAC control code; and acquiring the required voltage of the power-consuming unit according to the DAC control code, and comparing the required voltage with the power-consuming unit power supply input voltage to acquire a feedback voltage.

In the power supply protocol management method provided in the embodiment of the present invention, by searching the pre-stored VID protocol for the VID protocol which corresponds to the acquired VID protocol, it may thereby be applicable to occasions with different VID protocols so as to improve the applicability of the power supply.

In addition, before the step of acquiring the VID protocol, the method further includes altering or inputting the pre-stored VID protocol according to requirements. The purpose of this step lies in that the pre-stored VID protocol can be customized according to the requirements, so as to enlarge the application scope of the power supply protocol management method.

The foregoing description is only exemplary embodiments of the present invention and is not intended to limit the present invention. Any modification, equivalent replacement, or improvement made within the spirit and principle of the present invention shall fall within the protection scope of the present invention.

What is claimed is:

1. A power supply protocol management apparatus comprising:
   a storage module, configured to store a VID code conversion table;
   a power supply control code conversion module, configured to acquire a voltage identification VID protocol of a power-consuming unit and a VID code that is sent by the power-consuming unit according to the VID protocol, search the storage module for the VID code conversion table matching the VID protocol according to the VID protocol, and search the found VID code conversion table for a DAC control code which corresponds to the VID code output by the power-consuming unit and output the DAC control code;
   a DAC module, which is used by the power supply control code conversion module, configured to receive the DAC control code output by the power supply control code conversion module, and output a corresponding required voltage according to the DAC control code:
   wherein the power supply protocol management apparatus further comprises a programmable control port, the programmable control port is configured to establish correspondence between the VID protocol and a voltage value to be output by the power supply protocol management apparatus, and after acquiring VID information of the power-consuming unit, write a new VID protocol and the VID code conversion table which corresponds to the VID protocol into the storage module; and
   wherein the power supply protocol management apparatus further comprises:
   a voltage collection module configured to acquire a power supply input voltage of the power-consuming unit; and
   a calculation module configured to receive the power supply input voltage collected by the voltage collection module and a required voltage output by the DAC module, and calculate and output a voltage difference between the power supply input voltage and the required voltage.

2. The power supply protocol management apparatus according to claim 1, wherein the calculation module is configured to subtract the power supply input voltage of the power-consuming unit from the required voltage output by the DAC module, and amplify the voltage difference between the power supply input voltage and the required voltage output by the DAC module.

3. The power supply protocol management apparatus according to claim 1, wherein the power supply protocol management apparatus further comprises a voltage compensation module which is configured to add a compensation voltage value to the voltage difference output by the calculation module to focus a feedback voltage, and output the feedback voltage to a pulse-width modulation PWM power supply, wherein there is a reference voltage inside the PWM power supply, and the compensation voltage value equals the reference voltage value inside the PWM power supply.

4. The power supply protocol management apparatus according to claim 3, wherein the power supply protocol management apparatus further comprises a voltage monitoring module configured to monitor a voltage state of an input end of the power-consuming unit and send an indication of overvoltage or undervoltage to the power-consuming unit.

5. The power supply protocol management apparatus according to claim 3, wherein the power supply protocol management apparatus further comprises a current monitoring module configured to monitor a current state of the PWM power supply and send an indication of lightload or overcurrent to the power-consuming unit.

6. The power supply protocol management apparatus according to claim 3, wherein the power supply protocol management apparatus further comprises a temperature monitoring module configured to monitor a working temperature of the power-consuming unit and send a temperature alarm indication to the power-consuming unit in a case that a temperature exception occurs.

7. A power supply protocol management apparatus comprising:
   a storage module, configured to store a VID code conversion table;
   a power supply control code conversion module, configured to acquire a voltage identification VID protocol of a power-consuming unit and a VID code that is sent by the power-consuming unit according to the VID protocol, search the storage module for the VID code conversion table matching the VID protocol according to the VID protocol, and search the found VID code conversion table for a DAC control code which corresponds to the VID code output by the power-consuming unit and output the DAC control code;

a DAC module, which is used by the power supply control code conversion module, configured to receive the DAC control code output by the power supply control code conversion module, and output a corresponding required voltage according to the DAC control code:

wherein the power supply protocol management apparatus further comprises a programmable control port, the programmable control port is configured to establish correspondence between the VID protocol and a voltage value to be output by the power supply protocol management apparatus, and after acquiring VID information of the power-consuming unit, write a new VID protocol and the VID code conversion table which corresponds to the VID protocol into the storage module; and wherein the power supply protocol management apparatus further comprises:

a voltage collection module configured to acquire a power supply input voltage of the power-consuming unit;

an AD conversion module configured to convert an analog signal of the power supply input voltage of the power-consuming unit into a first digital signal and output the first digital signal;

a digital voltage compensation module configured to convert a compensation voltage into a digital signal identifiable by the DAC module, add the digital signal to the DAC control code output by the power supply control code conversion module to acquire a second digital signal, and output the second digital signal; and a digital calculation module configured to receive the first digital signal and the second digital signal, subtract the first digital signal from the second digital signal to acquire a feedback voltage digital signal, and transmit the feedback voltage digital signal to the DAC module so as to acquire a feedback voltage, wherein the feedback voltage is transmitted to a pulse-width modulation PWM power supply, and the pulse-width modulation PWM power supply adjusts the power supply input voltage of the power-consuming unit according to the feedback voltage.

8. A power supply system, comprising a pulse-width modulation PWM power supply and a power-consuming unit, and the PWM power supply is connected to the power-consuming unit to supply power to the power-consuming unit, wherein the power supply system further comprises a power supply protocol management apparatus, the power supply protocol management apparatus is configured to acquire a VID protocol of the power-consuming unit and acquire a VID code conversion table matching the VID protocol, the power supply protocol management apparatus converts a VID code output by the power-consuming unit on the basis of the VID protocol into a required voltage of the power-consuming unit according to the VID code conversion table, and compares the required voltage with a power supply input voltage of the power-consuming unit to generate a feedback voltage value, and the PWM power supply receives the feedback voltage and adjusts its output voltage according to the feedback voltage value, so that its output voltage equals the required voltage of the power-consuming unit, wherein the power supply protocol management apparatus comprises:

a storage module, configured to store the VID code conversion table;

a power supply control code conversion module, configured to acquire the VID protocol of the power-consuming unit and the VID code that is sent by the power-consuming unit on the basis of the VID protocol, search the storage module for the VID code conversion table matching the VID protocol according to the VID protocol, search the VID code conversion table for a DAC control code which corresponds to the VID code output by the power-consuming unit and output the DAC control code;

a DAC module, configured to receive the DAC control code and output the corresponding required voltage according to the DAC control code;

a voltage collection module, configured to acquire the power supply input voltage of the power-consuming unit;

a calculation module, configured to receive the power supply input voltage of the power-consuming unit and the required voltage output by the DAC module to calculate a voltage difference between the power supply input voltage of the power-consuming unit and the required voltage of the power-consuming unit, and output the voltage difference; and a voltage compensation module, configured to add a compensation voltage value to the voltage difference output by the calculation module to form the feedback voltage.

9. A power supply system, comprising a pulse-width modulation PWM power supply and a power-consuming unit, and the PWM power supply is connected to the power-consuming unit to supply power to the power-consuming unit, wherein the power supply system further comprises a power supply protocol management apparatus, the power supply protocol management apparatus is configured to acquire a VID protocol of the power-consuming unit and acquire a VID code conversion table matching the VID protocol, the power supply protocol management apparatus converts a VID code output by the power-consuming unit on the basis of the VID protocol into a required voltage of the power-consuming unit according to the VID code conversion table, and compares the required voltage with a power supply input voltage of the power-consuming unit to generate a feedback voltage value, and the PWM power supply receives the feedback voltage and adjusts its output voltage according to the feedback voltage value, so that its output voltage equals the required voltage of the power-consuming unit, wherein the power supply protocol management apparatus comprises:

a storage module, configured to store the VID code conversion table;

a power supply control code conversion module, configured to acquire the VID protocol of the power-consuming unit and the VID code that is sent by the power-consuming unit on the basis of the VID protocol, search the storage module for the VID code conversion table matching the VID protocol according to the VID protocol, and search the VID code conversion table for a DAC control code which corresponds to the VID code output by the power-consuming unit;

a voltage collection module, configured to acquire the power supply input voltage of the power-consuming unit;

an AD conversion module, configured to convert an analog signal of the power supply input voltage collected by the voltage collection module into a first digital signal, and output the first digital signal;

a digital voltage compensation module, configured to convert a compensation voltage into a digital signal identifiable by the DAC module, add the digital signal to the DAC control code output by the power supply control code conversion module to acquire a second digital signal, and output the second digital signal; and a digital calculation module, configured to subtract the first digital signal from the second digital signal to acquire a feedback voltage digital signal, and transmit the feedback voltage digital signal to the DAC module so as to acquire the feedback voltage.

10. The power supply system according to claim 8, wherein the power supply protocol management apparatus further comprises a programmable control port, configured to write a new VID protocol and the VID code conversion table which corresponds to the VID protocol into the storage module.

* * * * *